United States Patent Office 2,806,800
Patented Sept. 17, 1957

2,806,800

BORON AND CARBON CONTAINING HARD CEMENTED MATERIALS AND THEIR PRODUCTION

Frank W. Glaser, Lakewood, Ohio, assignor, by mesne assignments, to the United States of America as represented by the Secretary of the Navy No Drawing. Application November 10, 1955,
Serial No. 546,259

12 Claims. (Cl. 106—43)

This invention relates to hard materials or composition of matter, and to the production thereof. The hard materials of the invention are useful for cutting edge elements or cutting points of cutting tools, for dies, for providing wear-resistant surfaces, and for other applications requiring structural material combining strength, hardness, toughness, and resistance to deformation at high temperatures and pressures. This application is a continuation in part of the application of Frank W. Glaser for improvements in Boron Containing Hard Cemented Materials and Their Production, Serial No. 170,243, filed June 24, 1950.

Cemented hard metal carbides produced by powder metallurgy technique have long been recognized as the ideal material for applications such as cutting tools, dies, wear-resistant bodies and the like. The best cemented carbide tool material generally embodies as constituents, tungsten carbide, or the combination of tungsten carbide with addition of titanium, columbium, or tantalum carbide, or mixtures of solid solutions thereof, together with an additional cementitious or matrix metal consisting of cobalt, nickel, or alloys of cobalt or nickel.

In making such hard cemented carbide bodies, it was heretofore generally believed that in order to give them desired high mechanical strength it was essential to use as a cementing addition metals which are ductile and which have a considerably lower melting temeprature than the carbides.

The present invention is based on the discovery that boron, a substance which lacks ductility, and which has not been considered to be a metal, constitutes an unusually effective addition substance for use in lieu of known ductile cementing metals of relatively low melting point, such as cobalt and nickel in making hard cemented carbides.

As is known, the heretofore available cemented hard carbide materials are subject to what is known as "cratering" or "welding on" caused by heat and pressure, and consisting of chips of cut steel or the like adhering to the tool point strong enough to pull out carbide grains. It has also long been recognized that these deficiencies could be materially reduced by increasing the heat conductivity of such carbide tool material.

More specifically, the present invention is based on the discovery that hard cemented carbides combining known hard metal carbide constituents, with an addition of boron has all the desired characteristics of the best prior cemented hard metal carbides, with the additional advantage of much greater heat conductivity and much greater corrosion resistance, two factors of critical importance in most of the practical applications of cemented carbides.

In general, desirable cemented refractory carbide bodies of the invention may be produced by combining known hard metal carbide particles with an addition of boron in proportions varying from about 2% to 50% of the total composition (throughout the present specification and claims, all proportions are given by weight, unless specifically stated otherwise). However, cemented refractory carbide bodies of the invention having particularly desirable physical characteristics are obtained by confining the proportions of the addition substance to a more limited range, to wit, to from about 10% to 20% of the total composition, the balance being formed of the refractory carbide particles.

Another distinct phase of the present invention is based on the discovery that boron is also an effective addition substance for use in making hard cemented bodies out of fine particles of available silicides, nitrides, and oxides of the metals of the fourth to sixth groups of the periodic system.

Since the electrical conductivity characteristics closely parallel the heat conductivity characteristics of the substance involved, but are more accurately measured, the electrical conductivity, or rather its inverse, the electrical resistivity, will be used as the basis of comparison of the carbides referred to herein throughout the specification and claims. In other words, carbide materials having high heat conductivity have also high electrical conductivity, and vice versa. Thus, by way of comparison, whereas a typical prior art cemented tungsten carbide material has electrical resistivity of about 100 microhm-cm., a typical cemented carbide material of the present invention has electrical resistivity of only about half as high and less, and a correspondingly greater heat conductivity.

Furthermore, cemented carbide material of the present invention, using boron as an addition substance, has a much greater corrosion resistance, in fact greater by a factor of about 20, than the corrosion resistance of prior art cemented carbides using cobalt and/or nickel as a binder addition, the corrosion resistance increasing with the increase of the proportion of the boron addition.

It is accordingly an object of the invention to provide hard cemented carbides combining known hard metal carbide particles with boron as an addition substance.

It is also a distinct object of the invention to provide hard cemented materials or compositions combining an addition of boron with particles of silicides, nitrides, and oxides, as well as carbides of the metals of the fourth to sixth group of the periodic system and systems and mixtures thereof.

The present invention is based on the original discovery that—in producing hard cemented refractory material or composition of matter having desirable characteristics superior to those of cemented carbides—the borides of titanium, zirconium, vanadium, columbium, tantalum, molybdenum, tungsten, iron, manganese, chromium, and/or silicon, with or without a further addition of boron, all of which are refractory substances which lack ductility, and have very high melting points compared to cobalt and nickel, constitute highly effective addition substances for use—in lieu of known ductile cementing metals, such as cobalt and nickel, having relatively low melting points.

More particularly, the present invention is based on the discovery that desired cemented refractory bodies may be obtained by combining particles of known carbides of titanium, zirconium, vanadium, columbium, tantalum, molybdenum, tungsten, iron, manganese, chromium, and/or silicon, or mixtures of solid solutions of these carbides, with an addition or additions of particles of borides of titanium, zirconium, vanadium, columbium, tantalum, molybdenum, tungsten, iron, manganese, chromium, and/or silicon, without or with a further addition of boron particles, and that such cemented bodies constitute a system in which its chemical constituents are combined in a unique way responsible for the superior properties of such bodies.

In general, desirable cemented materials of the invention may be made by combining particles of the refractory metal carbide and with a refractory metal boride addition, with or without an addition of boron, into a cemented body system in which carbon constitutes from 0.2% to 25%, boron from 0.5% to 40%, and the metal from 50% to 90% of the body composition. These proportions correspond to a mixture of carbide particles which form 98% to 45% of the total mass, with boride particles which form 2% to 55% of the total mass. If a boron addition, in proportion of 2% to 25% of the total is used, the total of the boron and boride addition should preferably be limited to about 25% of the total mass of the composition.

Cemented bodies having particularly desirable physical characteristics are obtained in accordance with the invention by combining particles of the refractory metal carbide and the refractory metal boride, with or without an addition of boron, into a cemented body system in which carbon constitutes from 3% to 12%, boron from 15% to 35%, and the metal from about 50% to 90% of the body composition. These proportions correspond to a mixture of 95% to 70% of carbide particles with the balance of the boride, without and with the boron addition.

A unique characteristic of the cemented bodies of the present invention is the fact that they exhibit much greater heat conductivity than known cemented refractory carbides, in which the hard refractory carbide particles are cemented by the known ductile cementing metals, such as cobalt and nickel having a relatively low melting point. Since the more readily measured electrical conductivity characteristics closely parallel the heat conductivity characteristics of the substance involved, but are more accurately measured, the electrical conductivity, or rather its inverse, the electrical resistivity, will be used as a basis for comparison of the lower cemented bodies referred to herein throughout the specification and claims. In other words, cemented carbides having high heat conductivity, have also high electrical conductivity, or vice versa. Thus, by way of comparison, whereas typical prior art cemented tungsten carbide material has electrical resistivity of about 100 microhms-cm., in contrast, a typical cemented refractory material of the present invention has electrical resistivity of only about half as high and a correspondingly greater heat conductivity.

X-ray analysis shows that when particles of the carbides referred to above are combined with particles of a metal boride or borides referred to above without any addition of free boron, the application of heat and pressure to the mixture of the carbide and boride particles results in the formation of a cemented body in which the carbide and boride ingredients of the mixture of particles are present in substantially the same proportion as in the original mixture of different powder particles.

On the other hand, X-ray analysis shows when particles of the carbides referred to above are combined with particles of the borides referred to above, together with further addition of unbound or free boron, the application of heat and pressure to the mixture of the carbide, boride and boron particles results in the decomposition of the carbide ingredients and the formation of boride with the carbide-forming substance or substances in proportion to the boron present in the total ingredients of the mass of mixed powder particles. More particularly, X-ray analysis shows that the presence of unbound or free boron in a mixture of carbide particles subjected to pressure and heat results in the decomposition of carbide ingredients and the formation of corresponding borides in proportion to the boron present in the mixture.

Furthermore, cemented bodies of the present invention have a much higher corrosion resistance, in fact, greater by a factor of 10 to 20 than prior art cemented carbides using cobalt and/or nickel as binder additions. The increase in corrosion resistance rises with the increase of the proportion of boron in the composition.

It is accordingly, an object of the invention to provide hard cemented refractory bodies combining particles of known carbides of titanium, zirconium, vanadium, columbium, tantalum, molybdenum, tungsten, iron, manganese, chromium, and/or silicon, or mixtures of solid solutions of these carbides, with an addition or additions of particles of borides of titanium, zirconium, vanadium, columbium, tantalum, molybdenum, tungsten, iron, manganese, chromium, and/or silicon.

A further object of the invention is hard cemented refractory bodies combining particles of known carbides of titanium, zirconium, vanadium, columbium, tantalum, molybdenum, tungsten, iron, manganese, chromium, and/or silicon, or mixtures of solid solutions of these carbides, with an addition or additions of particles of borides of titanium, zirconium, vanadium, columbium, tantalum, molybdenum, tungsten, iron, manganese, chromium, and/or silicon with a further addition of boron, so as to form a cemented particle system of the elemental constituents of the several ingredients, thereby giving the resulting cemented body relatively high heat conductivity and electrical conductivity, and a correspondingly low electrical resistivity.

The foregoing and other objects of the invention will be best understood from the following detailed description of exemplifications thereof.

In producing cemented hard carbide materials of the invention, it is important that the hard carbide particles should be comminuted to a great degree of fineness, such as an average particle size of 1 to 2 microns, and that the comminution of the carbide particles should be effected under conditions which prevent oxidation of the particles. If the carbide particles are of a size materially larger than about 3 microns, such as 5 microns or more, the cemented carbide material is somewhat poorer in its physical characteristics. Carbide powders of desired particles size may be produced from a larger size powder, such as −100 mesh to −20 mesh powder, by ball-milling to size under an oxidation suppressing cover of a bath of saturated hydrocarbons, such as mineral oil within an atmosphere of inert gas, such as argon, maintained in the mill spaces under a positive pressure.

It is desirable that all ball-milling should be carried on in a mill having an interior surface or lining and balls of the same composition as an ingredient of the milled particles. If a steel mill and steel balls are used, the ferrous impurities should be removed after the milling by a treatment such as leaching with sulphuric acid diluted with water in concentration between 1:20 to 1:40. Before leaching the ball-milled powder should be cleaned of oil by diluting it and washing with an agent such as ether, acetone, or alcohol, followed by filtering.

The milled powder from which the ferrous particles have been removed is then washed with a volatile agent, such as alcohol or ether, and dried.

The fine dried carbide powder is then mixed with the boron addition to provide a uniform intimate mixture of the metal carbide particles with the boron addition. Since boron is extremely hard, it likewise should be reduced to a fine size such as about 2 microns or less, before it is mixed with the fine hard carbide particles. The boron may be comminuted to size by ball-milling in a manner analogous to the comminution of the carbide particles.

The desired intimate mixture of the carbide particles and the boron addition particles may be secured by subjecting the powder mixture to ball-milling for a sufficient length of time, such as 4 to 100 hours depending on design and dimensions of the ball-mill.

The desired ball-milling to mix is effected in a ball mill under an oxidation suppressing cover, such as a bath of purified mineral oil, and an atmosphere of argon. The oil is then removed from the ball-milled powder mixture, and the fine particle mixture is leached, washed and dried with a volatile agent such as alcohol. The ball-milling operation for reducing the carbide particles and for effecting the mixture of the carbide particles with the addition substance may be carried on within a bath of water, instead of mineral oil, in which case, however, the resulting powder mixture will exhibit poorer properties.

Out of the intimate mixture of fine carbide particles and boron addition particles, the desired cemented material or body is made by compacting and sintering. A very effective way for producing the desired shaped bodies out of such powder mixtures is by hot-pressing the powder mixture at a temperature of from 1200° to 2500° C. with pressures from .5 to 3.5 t. s. i. (tons per square inch). By hot-pressing such powder mixtures with graphite dies, the sintered particles are maintained in an atmosphere consisting predominantly of carbon dioxide, thus preserving them against oxidation. It is believed that for best results, the sintering should be carried on at a temperature at which a liquid phase may be expected, so that the sintering or combined pressing and sintering takes place in the presence of a liquid phase. To simplify the hot-pressing treatment, it may be preceded by cold-pressing the powder mixture in the die, in which it is thereafter hot-pressed.

The graphite dies should not be too hard in order to avoid their cracking. By subjecting the powder mixture to successive compacting and sintering treatment at successively higher temperatures, cemented carbide material of extremely high strength, toughness, density and hardness may be produced. In order to improve the physical characteristics of the hot-pressed cemented refractory carbide body it may be subjected to a similar additional sintering treatment within a protective atmosphere, such as purified hydrogen, or purified cracked ammonia for shorter or longer periods such as about one-half to several hours.

In producing a cemented body out of particles of different carbides, the initial or follow-up sintering treatments may be carried on for a sufficient length of time, and at sufficiently high temperatures to cause the different metal carbides of the different particles to mutually diffuse, and form solid solutions of the different carbides, particularly when the sintering is carried on at a temperature at which a liquid phase exists.

Sintered cemented carbide bodies of the invention may also be produced by first cold-pressing the fine powder mixture into a green compact with a pressure from about 1 to about 35 t. s. i., followed by sintering in a non-oxidizing, non-carburizing atmosphere, such as purified hydrogen, or purified cracked ammonia, at a temperature from about 1800° to 2400° C. for about one-half to twelve hours, or more.

The various known refractory hard carbides made by known processes are suitable for cemented refractory compositions of the invention. More specifically, the carbides of titanium, zirconium, columbium, molybdenum, tungsten, tantalum, iron, manganese, chromium and silicon are suitable for combining with a boron addition into a cemented body in accordance with the principles of the invention.

Because of their high heat conductivity, the present invention makes it possible to produce very effective hard refractory cemented carbide compositions with carbides of metals, such as titanium and zirconium, which are available in great abundance, as distinguished from the heretofore generally used cemented tungsten carbides which are relatively difficult to procure. Accordingly, because of their practical significance there will now be described specific examples of the practice of the invention, applied to the production of cemented titanium combined with boron as an addition substance.

A mixture of 85% titanium carbide powder (titanium with 19.3% combined carbon), together with an addition of 15% boron powder was hot-pressed with 3.5 t. s. i. at a temperature of 2400° C. The resulting body had the following characteristics: Modulus of rupture 130,000 to 140,000 p. s. i.; Rockwell A hardness 91; density 4.7 to 4.8 g./cc.; resistivity, 35 to 40 microhms-cm.

A similarly produced body of the same composition and hot-pressed with a pressure of .5 t. s. i., had the following characteristics: Modulus of rupture, 100,000 p. s. i.; Rockwell A hardness, 90; density, 4.6 to 4.7 g./cc.; resistivity, 30 to 35 microhms-cm.

Another body prepared in the same manner with a mixture of 85% titanium carbide powder (titanium combined with 19.3% combined carbon) and 15% cobalt boride hot-pressed with 1.5 t. s. i. at 2250° C. had substantially the same physical characteristics as example containing 15% boron.

As another example, a powder mixture of titanium carbide and 15% boron, was successively hot-pressed with a pressure of 1.5 t. s. i., first at an initial temperature of 1200° C., then re-pressed at 1400° C., and finally pressed at 1920° C., yielding a cemented body of the following characteristics: Modulus of rupture, 145,000 p. s. i.; Rockwell A hardness, 91; density, 4.75 g./cc.; resistivity, 20 to 21.5 microhms-cm.

As a further example, a mixture of 90% titanium carbide (with 19.3 combined carbon) and 10% boron was hot-pressed with 3.5 t. s. i. at 2350° C. The resulting body had the following characteristics: Modulus of rupture, 130,000; Rockwell A hardness, 92; density, 4.65 g./cc.; resistivity, 50 microhms-cm.

It will be noted that both of the cemented carbide bodies of the invention represented by examples given above have an electrical resistivity not exceeding 50 microhms-cm., as compared to the best of heretofore available cemented carbides, which had a resistivity of the order of 100 microhms-cm., and a correspondingly lower heat conductivity. The unusually high electrical conductivity of bodies of the invention and their correspondingly high heat conductivity, greatly reduces their tendency for "welding on" or "cratering" when used as a cutting tool, and in similar applications requiring a material of high hardness, toughness, and resistance to wear under a great pressure and at high temperature.

Cemented bodies of zirconium carbide and of other known refractory carbides, made with an addition of boron in the same way as the examples described above have improved physical characteristics of the same order.

Furthermore, by similar procedures, fine particles of the silicides, nitrides, and oxides of the metals of the fourth to sixth group of the periodic system may be mixed with an addition of boron in proportions varying from about 5% to 50% of the total body, and formed into cemented bodies of improved physical characteristics.

When a mixture of the refractory carbide particles with the addition of boron powder particles is subjected to the compacting and sintering treatment to produce cemented refractory bodies of the invention, such as represented by the examples given above, liquid phases are formed during sintering at high temperatures, and the resulting cemented body may not actually constitute a composition containing the mixture of the original ingredients out of which it was formed, but rather a system combining the constituents of the refractory carbide particles and the boron addition of the body, bound in a unique way which is effective in giving it unusual physical characteristics. Thus, by way of example, in case of the cemented refractory body of the invention produced out of a mixture of titanium carbide powder particles and boron powder particles hot-pressed with a pressure of 3.5 t. s. i. at a temperature of 2400° C., it constitutes a system of titanium, carbon and boron in which these constituents are present in proportions corresponding to the mixture of the titanium carbide particles and boron particles out of which such cemented refractory body was formed.

Cemented refractory carbide bodies of the invention having generally desirable characteristics similar to those illustrated by the examples given above, may be made by combining zirconium carbide or other known refractory carbides with the addition of boron in proportions from 5% to 50% of the total composition of the body in the manner described above. Cemented refractory bodies of the invention having particularly desirable characteristics are obtained by confining the addition substance, boron, to a more limited range of proportions, to wit, to from 10% to 20% of the total composition of the cemented refractory carbide body, the balance being formed of refractory carbide particles.

Cemented refractory carbide particles made with known cementing metals such as with 5% to 15% cobalt and/or nickel acquire greatly improved physical characteristics by combining with the ingredients of such bodies 2% to 15% boron by adding and mixing the boron in powder form with the carbide powder particles and the nickel and/or cobalt powder particles prior to compacting and sintering. However, when combining the carbides with the boron addition, as well as with cobalt and/or nickel, the total amount of the addition substance, to wit, nickel and/or cobalt, with from 2% to 15% boron, should not exceed in proportion about 25% of the total composition.

Cemented bodies of zirconium carbide and of other known refractory carbides, made with an addition of boron in the same way as the examples described above, have improved physical characteristics of the same order.

Boron is also a very effective addition substance for use in making hard cemented bodies when mixed with fine particles of known refractory silicides, nitrides, and oxides which are stable at high temperatures of about 1000° C. and higher. Among the silicides suitable for combining with a boron addition into hard cemented bodies of the invention are the silicides of molybdenum, titanium, zirconium, vanadium, chromium and tungsten. Among the nitrides suitable for combining with a boron addition into hard cemented bodies of the invention, are the nitrides of titanium, zirconium, columbium, vanadium, tantalum. Among the oxides suitable for combining with a boron addition into hard cemented bodies of the invention are the oxides of aluminum, titanium, zirconium, tantalum, columbium, magnesium, manganese, vanadium, and silicon.

By way of example, a mixture of fine particles of about 90% molybdenum disilicide with 10% boron, hot pressed with 3.5 t. s. i. at a temperature of 2400° C., yielded a hard cemented body having a density of about 5.8 g./cc., electrical resistivity of about 30 microhm-cm., and other physical characteristics of the same order as the cemented carbide bodies of the examples of the invention given above. As a similar cemented body made with 85% molybdenum disilicide, balance boron, had a density of about 5 g./cc., other resistivity of about 40 microhm-cm. and generally similar other characteristics. A similar cemented body made with 80% molybdenum disilicide, balance boron, had a density of about 5 g./cc., a resistivity of 55.5 microhm-cm. and, generally similar other physical characteristics. Such cemented molybdenum disilicide bodies of the invention had also great hot strength at temperatures of 1000° C. and above and exhibited resistance to corrosion within oxidizing atmospheres and combustion gases at high temperatures of 1000° C. and above.

The novel principles of the invention described above will suggest various modifications thereof and it is accordingly desired that the invention shall not be limited to any of the exemplifications described above.

I claim:

1. A hard body consisting essentially of from 50% to 80% of at least one carbide of a substance selected from the group consisting of titanium, zirconium, molybdenum, tungsten, vanadium, chromium, niobium, tantalum and silicon and 20% to 50% of boron, all proportions being by weight, the carbide ingredients of said body being bound by a solidified liquid phase containing at least some of its boron content.

2. In the method of manufacturing hard material, the procedure of providing an intimate mixture of particles of a major ingredient consisting of at least one carbide of a substance selected from the group consisting of titanium, zirconium, molybdenum, tungsten, vanadium, chromium, niobium, tantalum and silicon with additional ingredients consisting essentially of boron so that the major ingredient forms from about 98% to about 50% and the additional ingredients form from about 2% to about 50% of the total mass of said ingredients, and compacting said mixture under pressure and heating the compacted mixture at an elevated temperature in the range between about 1200° C. to 2500° C. at which a liquid phase is formed of at least some substance of at least some of said particles for combining the particles of said mixture so that upon cooling said mixture to a lower temperature said particles form a solid material constituting a system combining the chemical elements out of which said ingredients are constituted in proportions in which they are present in said ingredients.

3. A material as claimed in claim 1, the major ingredient consisting essentially of titanium carbide.

4. A material as claimed in claim 1, boron constituting about 10 to 20% by weight of the composition.

5. A material as claimed in claim 1, the major ingredient consisting essentially of zirconium carbide, boron constituting about 10 to 20% by weight of the composition.

6. A material as claimed in claim 1, the major ingredient consisting essentially of chromium carbide, boron constituting about 10 to 20% by weight of the composition.

7. A material as claimed in claim 1, the major ingredient consisting essentially of silicon carbide, boron constituting about 10 to 20% by weight of the composition.

8. The method of manufacturing solid material as claimed in claim 2, the mixture that is being compacted and heated containing about 80% to 50% by weight of the carbide and about 10 to 20% by weight of boron.

9. The method of manufacturing solid material as claimed in claim 2, the mixture that is being compacted and heated containing titanium carbide in an amount of 80% to 50% and boron in an amount of about 10% to 20% of the total weight of the mixture.

10. The method of manufacturing solid material as claimed in claim 2, the mixture that is being compacted and heated containing zirconium carbide as the major ingredient, and boron in an amount of about 10% to 20% of the total weight of the mixture.

11. The method of manufacturing solid material as claimed in claim 2, the mixture that is being compacted and heated containing chromium carbide as the major ingredient, and boron in an amount of about 10% to 20% of the total weight of the mixture.

12. The method of manufacturing solid material as claimed in claim 2, the mixture that is being compacted and heated containing silicon carbide as the major ingredient, and boron in an amount of about 10% to 20% of the total weight of the mixture.

References Cited in the file of this patent

UNITED STATES PATENTS

| | | |
|---|---|---|
| 864,723 | Bolling | Aug. 27, 1907 |
| 2,201,150 | Boyer et al. | May 21, 1940 |
| 2,412,373 | Wejnarth | Dec. 10, 1946 |
| 2,438,221 | Kurtz et al. | Mar. 23, 1948 |